United States Patent [19]

Fioratti

[11] Patent Number: 4,621,569
[45] Date of Patent: Nov. 11, 1986

[54] EXTRACTOR VENTILATOR FOR INDUSTRIAL BUILDINGS

[76] Inventor: Paolo Fioratti, Via P. Castaldi, 23, 20124 Milan, Italy

[21] Appl. No.: 701,666

[22] Filed: Feb. 15, 1985

Related U.S. Application Data

[63] Continuation of Ser. No. 386,316, Jun. 8, 1982, abandoned.

[30] Foreign Application Priority Data

Jun. 10, 1981 [IT] Italy ............................. 22235 A/81

[51] Int. Cl.$^4$ ............................................. F24F 7/02
[52] U.S. Cl. ...................................................... 98/422
[58] Field of Search ............... 98/42.01, 42.16, 42.17, 98/42.19, 42.20, 42.21, 121.1, 121.2

[56] References Cited

U.S. PATENT DOCUMENTS

| Re. 27,943 | 3/1974 | Smith | 98/42 A |
|---|---|---|---|
| 3,079,853 | 3/1963 | Smith | 98/42 A |
| 3,107,598 | 10/1963 | Rudy | 98/42 R |
| 3,182,580 | 5/1965 | Jueng | 98/42 R |
| 3,241,474 | 3/1966 | Rousey et al. | 98/121 R X |
| 3,247,775 | 4/1966 | Jueng | 98/42 A |
| 3,481,263 | 12/1969 | Belden | 98/42 A |
| 3,503,321 | 3/1970 | Hartman et al. | 98/121 A X |

FOREIGN PATENT DOCUMENTS

| 389996 | 4/1922 | Fed. Rep. of Germany | 98/42.20 |
|---|---|---|---|
| 2157189 | 6/1973 | Fed. Rep. of Germany | . |
| 2524314 | 12/1976 | Fed. Rep. of Germany | 98/42.20 |
| 3018051 | 11/1981 | Fed. Rep. of Germany | 98/42 A |
| 883144 | 12/1970 | Italy | . |
| 371879 | 10/1963 | Switzerland | . |
| 678032 | 8/1952 | United Kingdom | . |

Primary Examiner—Harold Joyce
Attorney, Agent, or Firm—Burns, Doane, Swecker & Mathis

[57] ABSTRACT

An extractor to be used in the natural ventilation of industrial buildings, for increasing the air flow during the summer season. The extractor, installed on the outside of openings provided in the roof or walls of the buildings to be ventilated, essentially comprises at least one free flow section associated to at least one controlled flow section, such as a "Mueller" static extractor, and provides means for subdividing said free flow section, consisting of rotary blades, and adjustment means interposing between the free flow section and the openings.

9 Claims, 15 Drawing Figures

EXTRACTOR VENTILATOR FOR INDUSTRIAL BUILDINGS

This application is a continuation, of application Ser. No. 386,316, filed June 8, 1982, now abandoned.

BACKGROUND OF THE INVENTION

This invention relates to an extractor designed to increase and regulate natural ventilation in industrial and/or agricultural buildings, such as industrial machining sheds, livestock-breeding farms, greenhouses and the like.

It is known that such buildings produce heat and harmful gases or fumes which must be continuously eliminated by means of a suitable air changing system. For obvious economic reasons, this problem is normally solved using ventilation systems with natural air circulation, which are simply called "static extractors". Only in particularly difficult cases, or in the presence of poison gases, use is made of ventilation systems with forced air circulation, equipped with appropriate ventilating fans. It should however be remembered that such fans—even apart from the costs—always cause localized air draughts which are harmful in some cases (for instance, in greenhouses), and for the health of the environment.

The aforespecified static extractors are usually installed at the top of a building (either on the summit of the roof or on the highest part of the side walls) for sucking stale air from the same. The intake of fresh air is instead guaranteed by a number of flap doors, or other similar openings, installed in the lower part of the building.

These extractors must simultaneously satisfy two fundamental and contrasting requirements, that is, on one hand they must prevent external atmospheric agents from propagating inside the building and, on the other hand, they must guarantee the outlet of the air stream which is extreme even and the flow of which varies according to requirements.

For what concerns the first problem, while it is relatively simple to prevent the inlet of water and snow, it is instead very difficult to prevent the access of wind, unless greatly reducing the free outlet sections of the extractor, thereby reducing the flow of outgoing air. On the other hand, it is particularly important to prevent the incoming wind from causing a reversal of the flow of outgoing air, and a consequent inlet of cold air from the top of the building, rather than from the openings provided for this purpose in the lower part of the building itself. In fact—particularly in the winter season, when the flow of outgoing air is reduced to a minimum (as will be better explained hereinafter)—the cold air eventually coming in from the top draws along with it the masses of stale rising air, recycling them with no possibility of control and hampering the regular change thereof. Furthermore, it causes undesired air draughts and an uncontrollable increase of the amount of heat required for keeping the environment in the desired conditions of temperature.

For what concerns the second problem, namely the control of the flow of fresh air coming out of the extractor, it should be noted first of all that it must be possible to vary said flow between a minimum value, typical of the winter season, and a maximum value which is instead typical of the summer season.

The minimum winter value is determined by the requirement to remove the least possible amount of heat in order to maintain a high difference between the indoor and outdoor temperature, while guaranteeing the dilution of the polluting gases circulating in the air and, at the same time, ensuring healthy environmental conditions. The maximum summer value is instead determined by the need to remove as much as possible of the heat produced within the building, in order to ensure the smallest difference between indoor and outdoor temperature (for instance, 4° or 5° C.).

It should at once be noted that the ratio between maximum and minimum flow is quite considerable and it can reach values of fifty or more.

Different types of static extractors have been proposed up to date, which have given preference to the solution of either of the aforementioned problems, while only one extractor has been proposed, apt to successfully overcome both problems, but the spreading of which has been impeded by the exceedingly high cost thereof. We shall now briefly examine the main static extractors of known type.

Perhaps the most widely known and spread static extractor now on the market is the "Robertson" extractor. This is characterized by a metal device generally mounted on the summit of the roof, having an elliptical cross section, open on top, and being provided inside with an overturned V-shaped bent tile surface apt to prevent the inlet of inclement atmosheric agents and to discharge them sideways. This extractor, though being fairly economic, presents however a number of drawbacks, such as the following:

having fairly large free outflow surfaces for the stale air, it is extremely easy for cold air to enter from the leeward side and, furthermore, under particularly severe conditions, even with protection against weather inclemencies is unsatisfactory;

in the event of abundant snowfalls, when it is out-of-work, it easily tends to clog with snow, with consequent overloads on the building;

the extraction effect is acceptable when the wind blows perpendicularly to the axis of the extractor, whereas, when the wind blows along said axis, its efficiency drops to very low levels;

its dimensions are very large, both in width and in height, as compared to the width of the roof opening it fits onto, whereby the weight of the extractor and the mechanical action thereon of the wind are such as to require—in most applications—that the roofing structure be specially reinforced, which notably reduces the economical advantages of this device.

The original "Robertson" extractor has been the object of several modifications and improvements, which have given rise to a number of improved extractors, among which we can recall the extractors object of the U.S. Pat. Nos. 3,107,598 and 3,182,580 and of the German Pat. No. 2,156,189. In these extractors, an attempt has been made to eliminate the drawbacks present in the "Robertson" extractor, particularly for what concerns the inlet of wind in the extractor itself. This result has been achieved, both by dividing the free outflow section into several sub-sections and by providing closing means which should operate in the winter season. The partial results obtained with these extractors are however not compensated by the weight and bulk, still very high, as well as by the further complexity deriving from the provision of the new devices. Moreover, the operation of the closing means in reply to unforeseeable events, such as are determined by atmospheric agents (particularly wind), can only be done manually, with all the inconveniences deriving therefrom, both from the economical point of view and from the point of view of the results obtained.

The British Pat. No. 678,032 describes an extractor which has excellent characteristics for what concerns the impenetrability to atmospheric agents, particularly wind. This is obtained, however, thanks to a particularly tortuous and narrow path of the flow of outgoing air, whereby this apparatus is fit only for applications which require a scare flow of extraction air, or it has to be used in combination with motor driven ventilators.

Another type of extractor is described in the Swiss Pat. No. 371,879. In this case, the device has a fairly light and simple structure and its free sections are wide enough to allow even high outflow rates of the stale air. Nonetheless, the devices provided therein for preventing the inlet of rain are scarcely efficient and, furthermore, the access to winds blowing crosswise is prevented only closing all the openings, thereby renouncing to the extracting action.

It can finally be said that the heretofore considered extractors, though varying in their achievements which involve different structural problems and hence different costs, still have in common the following drawbacks:
  they can be mounted only on the roof of the building to be ventilated, and not on the side walls thereof;
  they are not apt to prevent the inlet of winds blowing crosswise, unless by closing the openings for the passage of the flow of outgoing air, thereby annulling the extracting action;
  they are so formed as to pile up snow inside in case of abundant snowfalls. This drawback is particularly felt in the northern regions and it occurs when the plants are out-of-work, failing the heat produced inside the building.

As already mentioned, there is also a type of static extractor which has successfully solved the aforespecified problems. This extractor is commonly known as the "Mueller" or "Modified Mueller" extractor and it consists of a double layer of suitably shaped and spaced blades, as described in the Italian Pat. No. 883,144.

This last type of extractor has the characteristic of preventing the inlet of wind, no matter what direction it blows from, while it takes advantage of the depression caused by the wind—to a further extent in the leeward side of the building—in order to accomplish a particularly efficient extraction.

However, since this extractor (as, obviously, also all the previous ones) must clearly be dimensioned according to the maximum summer flow (the flow reduction in the winter season is in fact obtained by gradually closing the flap doors provided in the lower part of the building); and it is furthermore provided with a relatively low specific outflow surface, of relatively high unitary cost, it involves installation costs which are too heavy to allow its proper spreading on the market.

The object of the present invention is to overcome the aforespecified drawbacks by providing a device which—with a structure involving very limited costs and having characteristics of size and weight such as to present no problems of stability during installation—allows to adjustably increase the air flow during the summer season, as related to the minimal flow required in the winter season, while preventing the inlet of cold air in any weather conditions.

SUMMARY OF THE INVENTION

The invention thus relates to an extractor designed to increase and regulate natural ventilation in industrial buildings, of the type installed on the outside of openings provided in the roof or walls of such buildings, and being characterized in that it comprises, in combination: at least one controlled flow section and at least one free flow section, for the passage of stale air; blade means arranged within a line enveloping the extractor, ending onto said line and being positioned in the same quadrant thereof, in order to divide said free flow section into a plurality of smaller subsections; and means for closing and/or regulating the flow passing through the free flow section.

According to a main characteristic of the present invention, the controlled flow section is constituted by a "Mueller" or "Modified Mueller" extractor.

According to further characteristics of the invention, said dividing means consist of rectangular blades of fiberglass-reinforced plastic, and said closing and/or regulating means consist of the same blades pivoting on their own axis, or of flap doors pivoting on the edge of said openings and forming a rabbet against the ends of said free flow section.

BRIEF DESCRIPTION OF THE DRAWINGS

The invention will anyhow be described in detail, hereinafter, with reference to the accompanying drawings which illustrate some non-limiting embodiments thereof, and in which.

DESCRIPTION OF THE PREFERRED EMBODIMENTS

Figure 1:
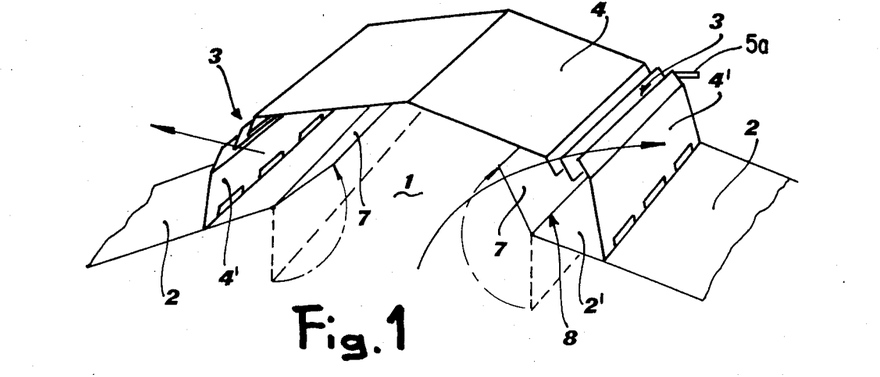
FIG. 1 is a schematic axonometric view of a portion of the extractor according to the present invention.

With reference to FIG. 1, the extractor according to the present invention is installed on the outside of an opening 1 provided on a roof 2, and it consists of two free flow sections 3 and of three controlled flow sections 4 and 4'. The area of the free flow sections 3, added to the product of the area of the controlled flow sections multiplied by the relative specific surface over which the air flows, is approximately equal to the area of the opening 1. Said controlled flow sections can be divided into:

no-flow sections, in which case they merely act as support and/or covering and are constituted by solid panelings (for instance, the sections 4');

positive flow sections, preferably constituted by static extractors of the "Mueller" type (for instance, section 4).

The free flow sections 3 are in turn divided into subsections 6 by a set of parallel rectangular blades 5, positioned longitudinally. These blades are arranged in such a way as to be included into a line enveloping the whole extractor, while ending onto said line, and they are positioned at an angle of between 45° and 80° in respect of the horizontal line. The blades 5 are fixed one to the other and to the sections 4 by any suitable means (not shown). It should be noted that sections 4' only rest to a slight extent with their lower edge onto the roof 2, to allow the drainage of rainwater which, through the sub-sections 6, falls onto that part of the roof 2' situated inside the extractor (see FIG. 2).

The air flow through the free flow sections 3 can be interrupted, in an adjustable way, by a pair of tilting flaps 7, pivoted onto the edge 8 of the roof portion 2' extending inside the extractor. The flaps 7 are dimensioned so as to form a rabbet against the ends of the controlled flow section 4.

Alternatively, the air flow through the free flow sections 3 may be regulated and/or interrupted by the same blades 5, pivoting on their own axis and caused to rotate, for example, simultaneously by interconnecting rod 5a.

Figure 2:
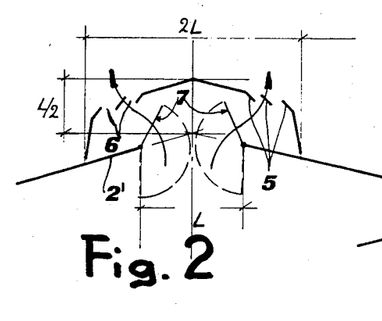
FIG. 2 is a schematic cross-section view of the same extractor.
Figure 3:
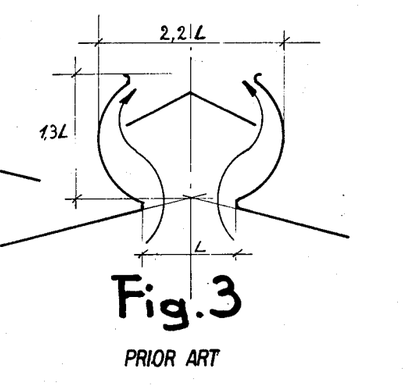
FIG. 3 is a schematic cross-section view of an extractor of the "Robertson" type.

FIGS. 2 and 3 compare the dimensions of a "Robertson" extractor with those of an extractor according to the present invention, showing the same width of the opening provided on the roof of the building to be ventilated (it should be here mentioned that the size of the opening must be in proportion to the maximum air flow required).

As clearly shown in said figures, for an opening of size "L", the "Robertson" extractor has a width of about 2.2 L and a height of about 1.3 L, while the extractor according to the present invention—while being slightly narrower than the "Robertson" extractor (2 L)—has a height ranging between L/2 and L/3, thus considerably lower. This makes the extractor according to the invention far superior to other known extractors, as to mechanical stability under the action of wind, and it allows, on one hand, to avoid costly operations of static reinforcement of the roof and, on the other hand, to make the whole device of plastic material, for instance fiberglass-reinforced plastic, with further reduction of costs and with great advantages as to the weight of the device and the easy mounting thereof.

Figures 4, 5:
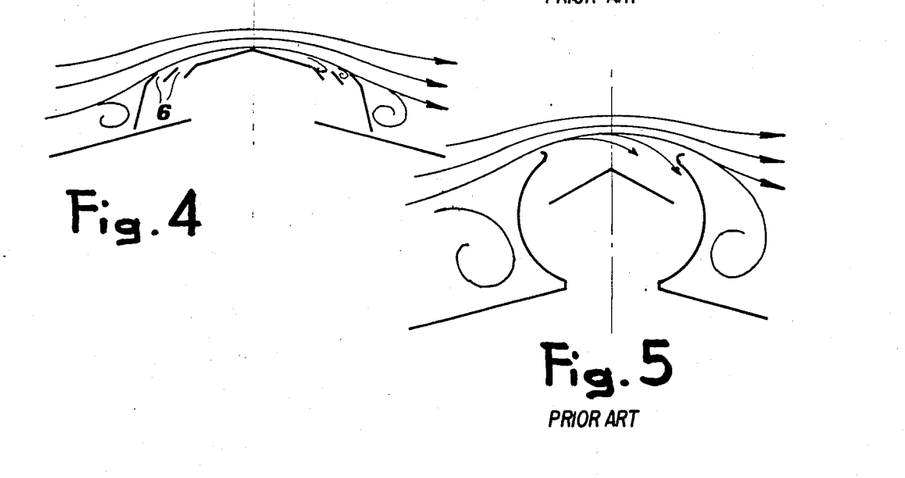
FIG. 4 is the same view of FIG. 2, showing the direction of the fluid stream of a wind blowing crosswise and hitting the extractor.
FIG. 5 is the same view of FIG. 3, showing the direction of the fluid stream of a wind blowing crosswise and hitting the extractor.
Figure 6:
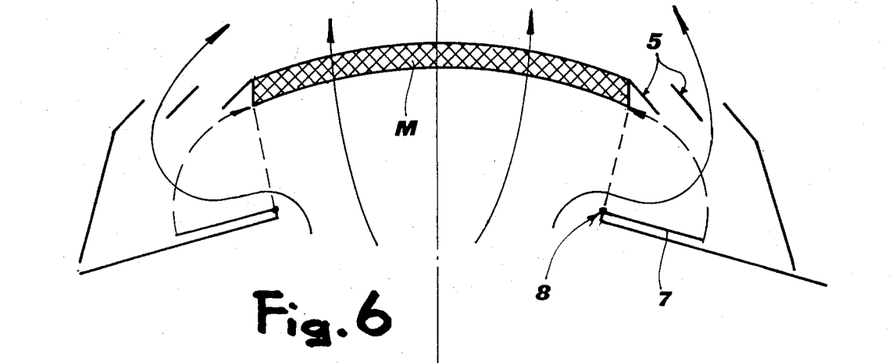
FIGS. 6, 7 and 8 are schematic section views of different embodiments of the extractor according to the present invention, installed on a roof, wherein the controlled flow section is constituted by an extractor of the "Mueller" type.
Figure 7:
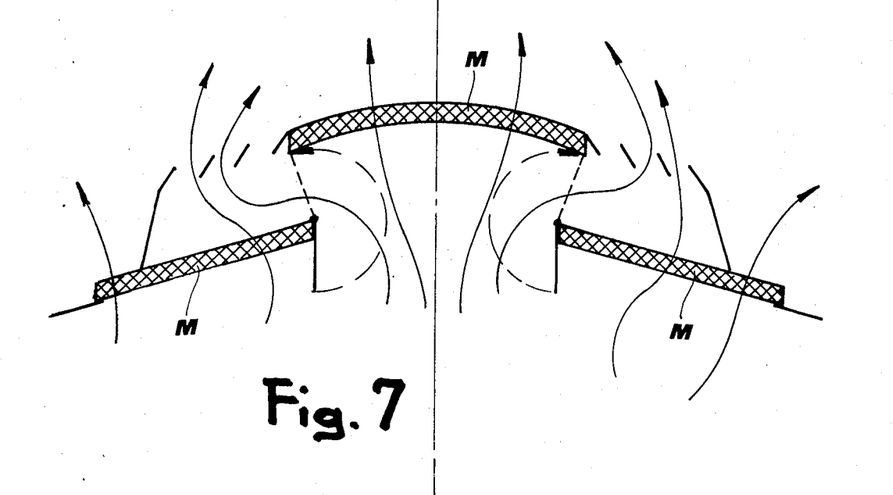
Figure 8:
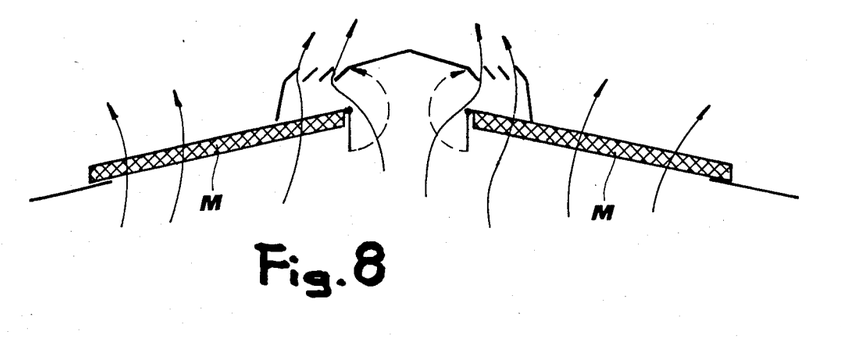
Figure 9:
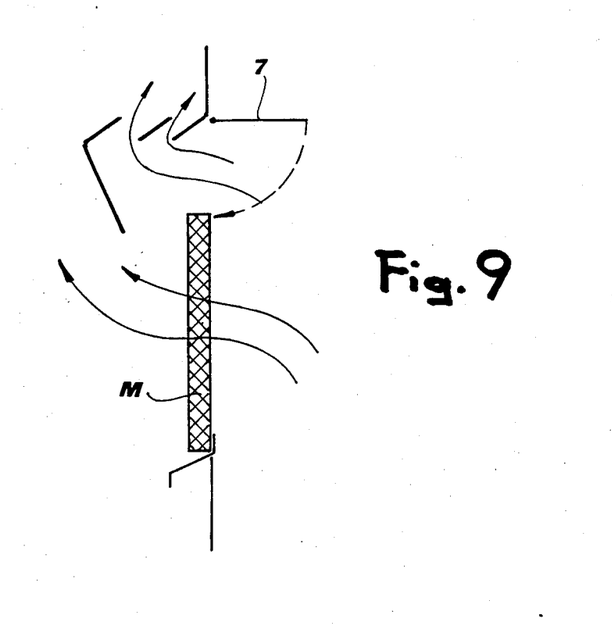
FIG. 9 is a schematic section view of the extractor according to the present invention, applied on a wall, wherein the controlled flow section is constituted by an extractor of the "Mueller" type.

FIGS. 4 and 5 show, respectively, the direction followed by the fluid stream over the extractor according to the invention and over a "Robertson" extractor. It can easily be seen that in the "Robertson" extractor, owing to the larger size of the openings, the wind is likely to penetrate in the leeward side, as largely demonstrated in practical applications where snowflakes were found to have actually enteres the building.

Whereas, in the extractor according to the present invention, the position of the blades 5—included into the line enveloping the whole extractor and variably inclined in respect of said line but positioned in the same quadrant thereof (the quadrant being formed by a horizontal line and by a vertical line)—favours the regular reforming of the fluid stream; furthermore, the possible turbulence caused by the limited dimensions of the sub-sections 6, occurs at the mouth of said sub-sections in the form of micro-whirls, which in turn determine an air pressure drop, such as to prevent almost entirely the inlet of wind. The extraction effect, as in the "Robertson" extractor, evidently takes place on the windward side, where a Venturi-effect depression is created.

FIGS. 6, 7, 8 and 9 show different embodiments of the extractor according to the present invention, wherein some of the controlled flow sections and/or part of the roofings or walls (FIG. 9) comprise "Mueller" extractors. These sectiona are marked in the figures with the letter "M".

Referring to FIGS. 12-15, a typical Mueller static extractor includes a plurality of slats L1 reciprocally set side by side at appropriate intervals and behind which a second series of slats L2 is disposed in which every individual element remains set in a position corresponding to the opening of slot A which exists between the contiguous slots L1.

In a first form of realization (FIGS. 12 and 13), the slats L1, L2 have a transversal section with an undulated profile having on the outside E of these slats a median convexity C.

Figure 12:
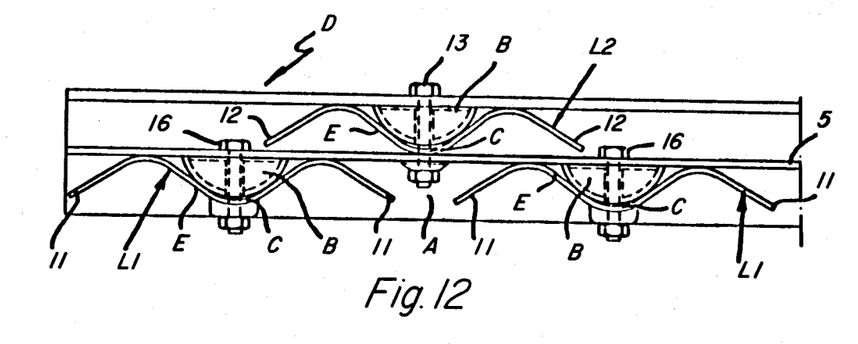
FIG. 12 is an edge view of a typical Mueller extractor.
Figure 13:
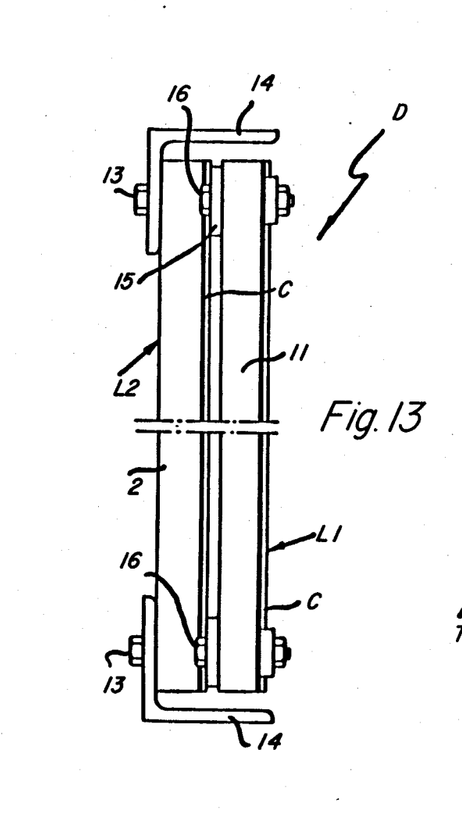
FIG. 13 is a lateral view of the extractor of FIG. 12.

The lateral extremities 11 contiguous to the adjacent slat L1 converge, among themselves, toward the outside thus creating the opening or slots A, with a transversal section substantially like an exhaust.

Of course, the interval between the adjacent slats L2 can also be like an exhaust, the extremities 12 of these slats L2 are bent toward the outside at a predetermined angle.

The slats L2 are supported by means of the bolts 13, from two braces 14 preferably L shaped, in the same manner the bolts 13 support two splines 15 on which the slats L1 are mounted in the appropriate manner by means of the bolts 16.

Filling bodies B, preferably semiround, prevent the deformation of the slats L1, L2 mounted in this manner.

In a second realization (FIG. 14), the slats L1, L2 have on their outside edge E1 a substantial concavity connected in the middle by a ridge 17.

Figure 14:
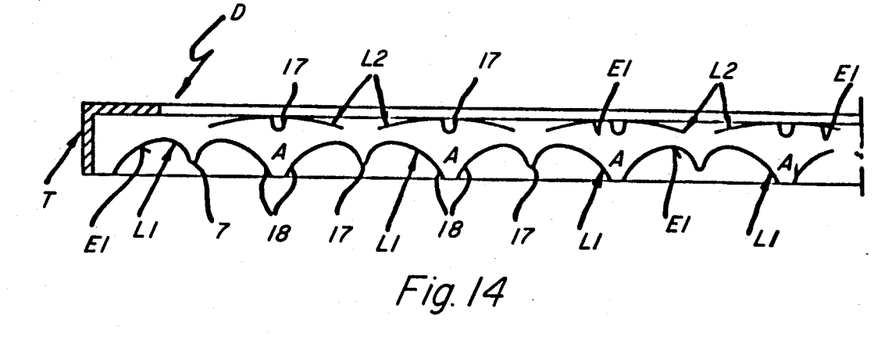
FIG. 14 is an edge view of another embodiment of a Mueller extractor.
Figure 15:
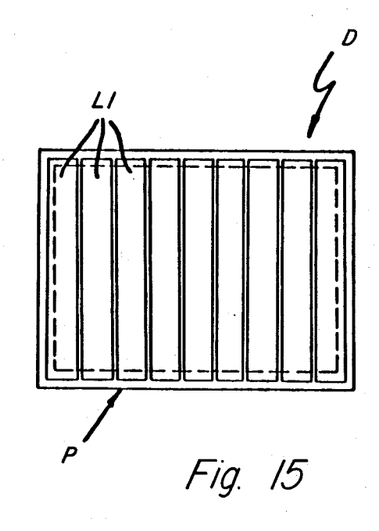
FIG. 15 is a planar view of the extractor of FIG. 1.

The lateral extremities 18 contiguous to the adjacent slats L1 converge between themselves toward the outside, thus determining the appropriate configuration in exhaust of the opening A.

A framing element T supports the slats L1, L2.

The slats L1, L2, in couples, with the proper supporting elements, are examples of the aforementioned realizations, one or more panels P (FIG. 15) can constitute the Mueller static extractor.

In addition, the slats L1, L2 are made up, at least in part, of transparent and anti-corrosive material, preferably of suitable plastic material or of glass.

In all such embodiments, the surface covered by the "Mueller" extractor is related in size to a flow value ranging between the minimum (winter) value and a value twice to three times higher, while the flow required during the summer season (i.e. up to 50 or more times higher than the minimum flow value) is obtained through the free flow sections 3 of the extractor according to the invention, placed gradually in communication with the opening 1 thanks to the already seen adjustment means.

It is quite evident that the heretofore described and illustrated extractor ensures great economy of use, without reducing the quality of the ventilation. In fact, during the winter season when the difference in density between the outgoing hot air masses and the outdoor cold air masses is greatest, whereby the danger of any cold air draughts entering the building is higher owing to the strong disturbance which they create in the air circulation, the free flow sections 3 are completely cut off from the opening 1 via the flaps 7 or, alternatively, they are closed off by the blades 5, rotated up to overlapping. Thus only the "Mueller" extractor remains in operation, with its excellent heretofore specified characteristics.

As the outside temperature gradually increases and the need for a greater flow of fresh air thus grows, the flaps 7 will be gradually opened or, alternatively, the blades 5 rotated, giving rise to an additional flow through the free flow sections 3. It is worth while noting that, during the summer season, any reversals of the air flow or any cold air which may return from the freeflow sections 3, are far less dangerous due to the far smaller difference in density between hot and cold air and, moreover, due to the fact that any cold air draughts entering through the free flow sections 3, would be immediately re-expelled by the powerful flow going out from the adjacent section constituted by the "Mueller" extractor.

This means that in every season it is possible to keep the environment in the desired physical conditions, and the level of the polluting gases can be perfectly controlled, thanks to the fact that the system prevents them from being recycled.

It should finally be noted that, since the "Mueller" extractor can be made of materials which are at least partly transparent to light, the extractor according to the present invention can also act as skylight.

Figure 10:
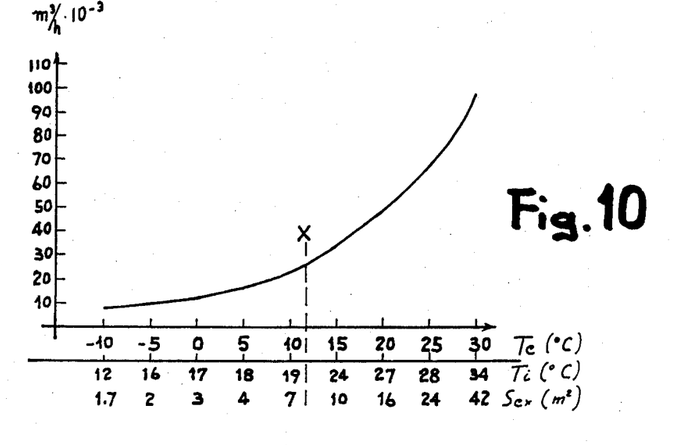
FIGS. 10 and 11 are two graphs illustrating the operation of the extractor in two practical applications.
Figure 11:
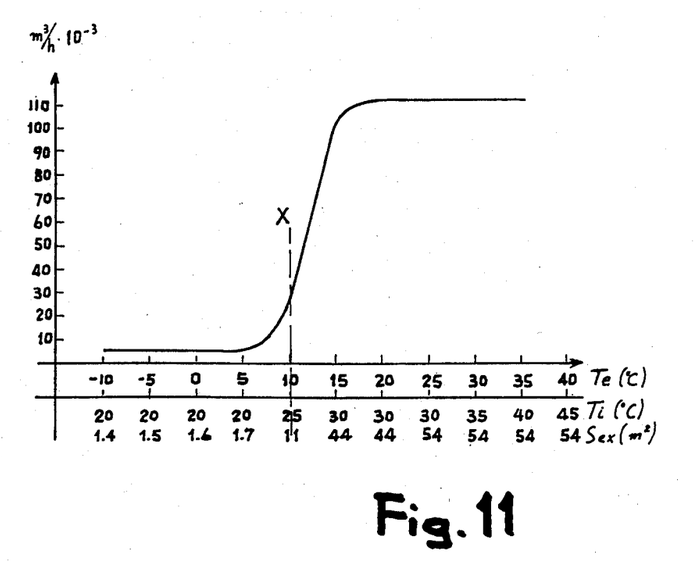

The last two figures of the drawings show two graphs relating to the fresh air flow (ordinates) in function of the outside temperature (abscisses). The abscisses also include the corresponding indoor temperature values (Ti) and the surface areas of the extractors used (Sex). The temperatures are in °C., the surface areas in m² and the flow rates in m³/h 10⁻³. The two cases refer to two typical applications, a livestock-breeding farm (FIG. 10) and a greenhouse (FIG. 11).

As can be seen from the graphs, only the "Mueller" extractors are used up to an outside temperature of approximately 10°-12° C. (X point); then, starting from this temperature value, the free flow sections 3 are gradually set to work. The maximum flow for which the "Mueller" extractors have to be dimensioned is, in this case, only twice or three times the minimum (winter) flow, instead of being up to 50 or more times greater, as would have been required using the previous technique.

It is understood that the invention should not be limited to the various heretofore described embodiments, but that its scope should extend to any variants or modifications thereof, within reach of the technicians skilled in the art.

I claim:

1. An extractor designed to increase and regulate the natural ventilation in buildings, the extractor being adapted to be installed on the outside of an opening provided in the roof of such buildings, the extractor comprising controlled flow means for passing at least a minimum flow of air and a plurality of free flow passage means at the exterior of said extractor for passing an additional flow of air, said controlled flow means comprising air permeable, upper exterior surfaces of the extractor, which surfaces substantially span said opening and are upwardly inclined so as to define a highest portion of said extractor located generally centrally over said opening, said free flow passage means arranged along opposite lower edges of said upper exterior surfaces and including blade means for dividing said free flow passage means into a plurality of smaller openings so as to substantially prevent crosswinds from entering said extractor through said free flow passage means; and means for regulating the amount of flow passing through said free flow passage means.

2. The extractor as in claim 1, wherein said controlled flow means comprises a static extractor.

3. The extractor as in claim 1, wherein said blade means comprises plastic elements.

4. The extractor as in claim 1, wherein said blade means comprises rectangular blades having an inclination with respect to a horizontal line varying between 45° and 80°.

5. The extractor as claimed in claim 1, wherein said blade means comprises a plurality of blades which are each pivotable about their own longitudinal axis.

6. The extractor as in claim 1, wherein said regulating means comprises flap doors pivoted on opposite edges of said opening for regulating the air flow through said free flow passage means.

7. The extractor as claimed in claim 5, wherein said regulating means comprises said blades and means for moving said blades simultaneously.

8. The extractor as in claim 1, wherein an overall width and height of the extractor are equal to approximately 2 and 0.4, respectively, times the width of said opening.

9. The extractor as claimed in claim 2, wherein said static extractor comprises a first layer of parallel, spaced apart slats having undulated transverse profiles and a second layer of parallel, spaced-apart slats having undulated transverse profiles, slats of one of said layers superposing spaces between slats of the other of said layers.

* * * * *